United States Patent
Bresser et al.

(10) Patent No.: US 10,668,911 B2
(45) Date of Patent: Jun. 2, 2020

(54) CONTROLLER AND METHOD FOR ACTUATING AT LEAST ONE VALVE OF A BRAKE SYSTEM OF A VEHICLE, SAID VALVE BEING CLOSED IN THE DE-ENERGIZED STATE

(71) Applicant: Robert Bosch GmbH, Stuttgart (DE)

(72) Inventors: Andreas Bresser, Ludwigsburg (DE); Michael Knoop, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 11 days.

(21) Appl. No.: 16/068,580

(22) PCT Filed: Nov. 30, 2016

(86) PCT No.: PCT/EP2016/079306
§ 371 (c)(1),
(2) Date: Jul. 6, 2018

(87) PCT Pub. No.: WO2017/125189
PCT Pub. Date: Jul. 27, 2017

(65) Prior Publication Data
US 2019/0009764 A1   Jan. 10, 2019

(30) Foreign Application Priority Data

Jan. 22, 2016   (DE) .................. 10 2016 200 864

(51) Int. Cl.
*B60T 13/68* (2006.01)
*B60T 7/04* (2006.01)
(Continued)

(52) U.S. Cl.
CPC ............ *B60T 13/686* (2013.01); *B60T 7/042* (2013.01); *B60T 8/4081* (2013.01);
(Continued)

(58) Field of Classification Search
CPC ... B60T 8/17; B60T 8/36; B60T 8/326; B60T 13/58; B60T 13/66; B60T 13/146; B60T 13/662; B60T 13/686; B60T 17/22
(Continued)

(56) References Cited

U.S. PATENT DOCUMENTS

2006/0158032 A1\* 7/2006 Miyazaki ................ B60T 8/367
    303/155
2009/0289494 A1\* 11/2009 Landesfeind ............ B60T 8/36
    303/119.2
(Continued)

FOREIGN PATENT DOCUMENTS

JP    2010-221834 A    10/2010
JP    2014-083977 A    5/2014
(Continued)

OTHER PUBLICATIONS

International Search Report corresponding to PCT Application No. PCT/EP2016/079306, dated Mar. 1, 2017 (German and English language document) (5 pages).

*Primary Examiner* — Christopher P Schwartz
(74) *Attorney, Agent, or Firm* — Maginot, Moore & Beck LLP

(57) ABSTRACT

A controller is configured to control at least one valve of a brake system of a vehicle that is closed in a de-energized state. The controller includes an actuation device configured to actuate the valve into an open state and to keep the valve in the open state. A holding current with at least one first average target current strength is output as a control signal by the actuation device to the valve. The holding current output to the valve is increased to at least one second average target current strength which is greater than the first average target current strength while taking into consideration provided information pertaining to a current rotational speed of an electric motor of a piston/cylinder device of the
(Continued)

brake system and/or at least one current hydraulic pressure in at least one sub-volume of the brake system.

13 Claims, 2 Drawing Sheets

(51) Int. Cl.
*B60T 8/40* (2006.01)
*B60T 13/66* (2006.01)
*B60T 13/74* (2006.01)
*B60T 13/14* (2006.01)
*B60T 13/58* (2006.01)

(52) U.S. Cl.
CPC ............ *B60T 13/146* (2013.01); *B60T 13/58* (2013.01); *B60T 13/662* (2013.01); *B60T 13/745* (2013.01); *B60T 2270/404* (2013.01); *B60T 2270/82* (2013.01)

(58) Field of Classification Search
USPC ..................... 303/3, 6.01, 15, 20, 119.2, 155
See application file for complete search history.

(56) References Cited

U.S. PATENT DOCUMENTS

| | | | | |
|---|---|---|---|---|
| 2012/0285555 | A1* | 11/2012 | Shimono | B60T 8/36 137/487.5 |
| 2013/0147260 | A1* | 6/2013 | Loos | B60T 8/36 303/20 |
| 2014/0028083 | A1* | 1/2014 | Gerdes | B60T 1/10 303/6.01 |
| 2016/0221558 | A1* | 8/2016 | Nishida | B60T 13/146 |

FOREIGN PATENT DOCUMENTS

| | | |
|---|---|---|
| JP | 2015-058833 A | 3/2015 |
| JP | 2015-063194 A | 4/2015 |
| WO | 2014/154435 A1 | 10/2014 |

\* cited by examiner

CONTROLLER AND METHOD FOR ACTUATING AT LEAST ONE VALVE OF A BRAKE SYSTEM OF A VEHICLE, SAID VALVE BEING CLOSED IN THE DE-ENERGIZED STATE

This application is a 35 U.S.C. § 371 National Stage Application of PCT/EP2016/079306, filed on Nov. 30, 2016, which claims the benefit of priority to Serial No. DE 10 2016 200 864.1, filed on Jan. 22, 2016 in Germany, the disclosures of which are incorporated herein by reference in their entirety.

The disclosure concerns a controller for at least one normally closed valve of a brake system of a vehicle. The disclosure also concerns a brake system for a vehicle. Furthermore, the disclosure concerns a method for actuating at least one normally closed valve of a brake system of a vehicle and a method for operating a brake system of a vehicle.

BACKGROUND

In WO 2014/154435 A1, a brake system for a vehicle and a method for operating the brake system are described. The brake system has a master brake cylinder and two brake circuits connected to the master brake cylinder, wherein each of the two brake circuits is connected via a normally open valve to a pressure chamber of the master brake cylinder that is associated therewith. Moreover, the brake system comprises a piston-cylinder mechanism with a piston that is displaceable by means of a motor and that bounds an intermediate storage volume of the piston-cylinder mechanism. Each of the two brake circuits of the brake system is hydraulically connected to the intermediate storage volume via a normally closed valve.

SUMMARY

The disclosure provides a controller for at least one normally closed valve of a brake system of a vehicle, a brake system for a vehicle, a method for actuating at least one normally closed valve of a brake system of a vehicle and a method for operating a brake system of a vehicle.

When using the subject matter of the disclosure, the current average setpoint current strength (for each normally closed valve being controlled/held open) of the holding current that is output to the at least one normally closed valve is adjusted for the current revolution rate of the electric motor of the piston-cylinder mechanism and/or for the at least one current hydraulic pressure in the at least one sub-volume of the brake system. The current average current strength of the holding current (for each valve that is normally controlled/held open) correlates with a closing time of the at least one actuated normally closed valve in the event of a sudden failure of a current supply/voltage supply. By means of the disclosure, it is thus ensured that the closing time of the at least one normally closed valve that is controlled/held open occurring in the event of a sudden failure of the current supply/voltage supply is sufficient to counteract pressure and torque peaks. The disclosure thus reduces pressure and torque peaks and, in this way, protects components of the brake system that is being used to exploit the disclosure.

The disclosure can be implemented by means of controller electronics that are inexpensive and that require little installation space. Further hardware measures are not necessary for the brake system that is used to implement the disclosure. Moreover, the disclosure contributes to the protection of components of said brake system, even if said brake system is embodied with components that are susceptible to pressure or torque peaks. The disclosure therefore also enables the realization of simpler manufacturing processes and the use of less expensive materials for a brake system.

Preferably, during the controlling and holding of the normally closed valve in the open state thereof the actuator is designed to increase the holding current to at least twice the average setpoint current strength, once the current revolution rate of the motor exceeds a predetermined revolution rate limit of the motor and/or the at least one current hydraulic pressure exceeds at least one predetermined pressure limit. At a relatively high revolution rate of the electric motor of the piston-cylinder mechanism, the kinetic energy thereof continues to drive the at least one piston of the intermediate storage volume despite the collapse of the current and voltage supply thereof, so that premature wear of the at least one intermediate storage volume of the piston-cylinder mechanism could result in a significant build-up of pressure. By means of the adjustment according to the disclosure of the current average setpoint current strength of the holding current for the current revolution rate of the electric motor, it can however be ensured that the closure of the normally closed valve triggered by the collapse of the current and voltage supply is delayed until a significant build-up of pressure in the intermediate storage volume. There is thus no risk that components of the brake system, such as for example the respective normally closed valve or a gearbox of the piston-cylinder mechanism, will be damaged because of an unwanted excess pressure in the intermediate storage volume.

Accordingly, taking into account the at least one current hydraulic pressure in the at least one sub-volume of the brake system also results in increased protection of components of the brake system by delaying the closing time of the normally closed valve in the event of failure of the current and voltage supply.

For example, the actuator can be designed to keep the holding current at the first average setpoint current strength between 0.3 A and 1 A during the controlling and holding of the normally closed valve in the open state thereof, as long as the current revolution rate of the motor is less than the predetermined revolution rate limit of the motor and/or the at least one current hydraulic pressure is less than the at least one predetermined pressure limit, and to increase the holding current to twice the average setpoint current strength between 1.5 A and 3 A once the current revolution rate of the motor exceeds the predetermined revolution rate limit of the motor and/or the at least one current hydraulic pressure exceeds the at least one predetermined pressure limit. The numerical values stated here are only to be considered to be examples, however.

Also, the brake system for a vehicle with a controller of this type, with the normally closed valve that can be controlled and kept in the open state thereof by means of the controller, a master brake cylinder, at least one brake circuit connected to the master brake cylinder with at least one wheel brake cylinder and the piston-cylinder mechanism, wherein at least one intermediate storage volume of the piston-cylinder mechanism is hydraulically connected to the at least one associated brake circuit via the normally closed valve that can be controlled and kept in the open state thereof by means of the controller so that brake fluid from the at least one intermediate storage volume can be displaced into at least one associated brake circuit via the normally closed valve that is controlled and held in the open state thereof by means of the controller, satisfies the advantages described above.

In an advantageous embodiment of the brake system, a first brake circuit and a second brake circuit are connected to the master brake cylinder as the at least one brake circuit, and the at least one intermediate storage volume is hydraulically connected to the first brake circuit via the normally closed valve that can be controlled and kept in the open state thereof by means of the controller and to the second brake circuit via a further normally closed valve that can be controlled and kept in the open state thereof by means of the controller. In this case, it is preferable if, during the controlling and holding of the (two) normally closed valves in the open state thereof, the actuator of the controller is arranged to increase the holding current that is output to the normally closed valves to at least the second average setpoint current strength that is greater than the first average setpoint current strength, while taking into account the information provided. The advantages of the controller according to the disclosure can thus also be used for two normally closed valves.

The advantages described above are also provided by the corresponding method for actuating at least one normally closed valve of a brake system of a vehicle.

Furthermore, implementing the corresponding method for operating a brake system of a vehicle realizes the advantages described above.

BRIEF DESCRIPTION OF THE DRAWINGS

Further features and advantages of the disclosure are described below using the figures. In the figures.

DETAILED DESCRIPTION

Figure 1A:
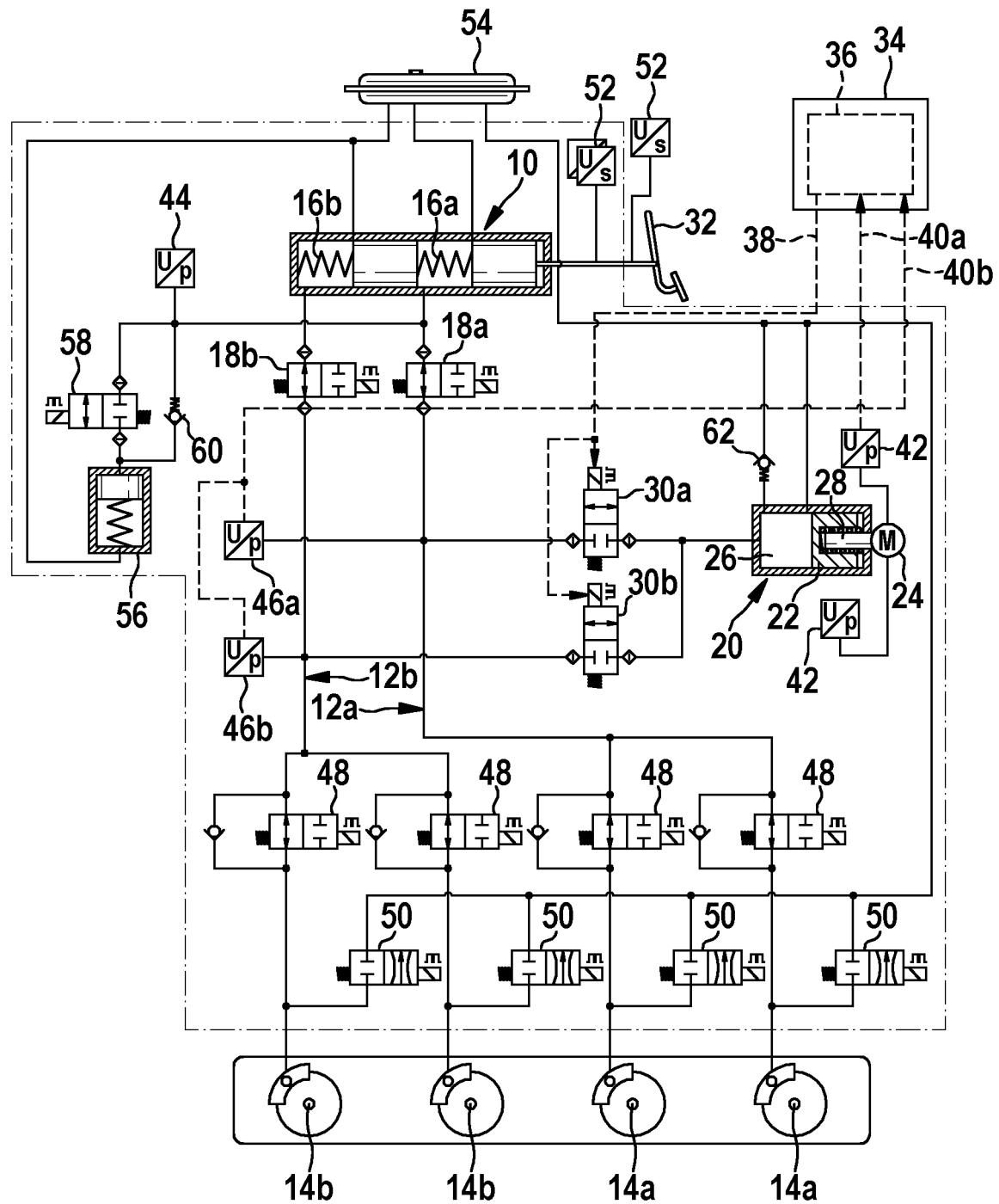
FIGS. 1a and 1b show a schematic representation of an embodiment of the brake system and a coordinate system for describing the operation of the controller thereof.
Figure 1B:
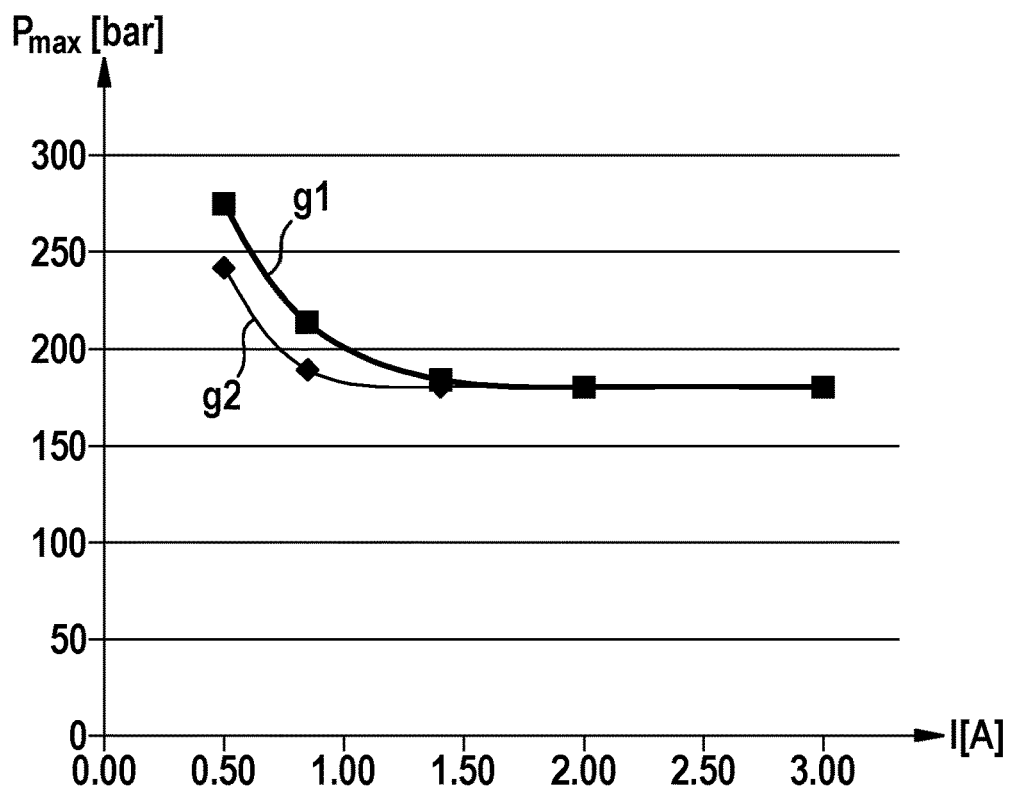

FIGS. 1a and 1b show a schematic representation of an embodiment of the brake system and a coordinate system for describing the operation of said controller.

The brake system schematically represented in FIG. 1a can be used for a number of vehicles/motor vehicles. It should be noted that the applicability of the brake system of FIG. 1a is not limited to any specific type of vehicle/type of motor vehicle.

The brake system of FIG. 1a has a master brake cylinder 10 and at least one brake circuit 12a and 12b connected to the master brake cylinder 10 with at least one wheel brake cylinder 14a and 14b. By way of example, (as the at least one brake circuit 12a and 12b) a first brake circuit 12a is connected to a first pressure chamber 16a of the master brake cylinder 10 and a second brake circuit 12b is connected to a second pressure chamber 16b of the master brake cylinder 10 via a normally open valve 18a or 18b in each case. Each of the brake circuits 12a and 12b can for example comprise two wheel brake cylinders 14a or 14b. It is however also to be noted that the structure of the brake system is neither limited to a defined number of brake circuits 12a and 12b nor to a defined number of wheel brake cylinders 14a and 14b thereof.

Moreover, the brake system is equipped with a (motorized) piston-cylinder mechanism 20. The piston-cylinder mechanism 20 has at least one piston 22 that can be displaced by the operation of an electric motor 24 so that at least one intermediate storage volume 26 of the piston-cylinder mechanism 20 can be increased or reduced by displacement of the at least one bounding piston 22. For example, the at least one piston 22 can be connected to the electric motor 24 by means of a gearbox 28. The structure of the piston-cylinder mechanism 20 is not limited to a defined gearbox type for the gearbox 28.

The at least one intermediate volume 26 of the piston-cylinder mechanism 20 is hydraulically connected to the at least one associated brake circuit 12a and 12b via at least one normally closed valve 30a and 30b so that the brake fluid from the at least one intermediate storage volume 26 can be displaced into the at least one associated brake circuit 12a and 12b via the at least one normally closed valve 30a and 30b controlled and/or held in the open state thereof. Operation of the piston-cylinder mechanism 20 can thus be used for brake force boosting and/or for external power braking (without the operation of a brake pedal 32 by a driver). Accordingly, brake fluid is also induced into the at least one intermediate storage volume 26 from the at least one associated brake circuit 12a and 12b via the at least one normally closed valve 30a and 30b controlled and/or held in the open state thereof. Therefore, the piston-cylinder mechanism 20 can also be used to add a generator braking torque that is produced by a generator (optional, not shown). Regarding the possibilities for using the piston-cylinder mechanism 20, refer to WO 2014/154435 A1, for example.

The at least one normally closed valve 30a and 30b can be controlled and kept in the open state thereof by means of a controller 34. (The respective open state of the at least one normally closed valve 30a and 30b preferably means the fully open state thereof.) In the example of FIG. 1a, the at least one intermediate storage volume 26 is hydraulically connected to the first brake circuit 12a via the first normally closed valve 30a that can be controlled and kept in the open state thereof by means of the controller 34 and to the second brake circuit 12b via the second normally closed valve 30b that can be controlled and kept in the open state thereof by means of the controller 34. Alternatively however, both brake circuits 12a and 12b, only one of the brake circuits 12a or 12b or only a single brake circuit of the brake system can also be connected to the at least one intermediate storage volume 26 via a single normally closed valve of the brake system. Moreover, further components of the brake system may also be controlled by means of the controller 34.

The controller 34 has an actuator 36 that is arranged to control and to keep the single normally closed valve/the normally closed valves 30a and 30b in the respective open state. This is carried out by a holding current with at least one first average setpoint current strength (for each actuated normally closed valve 30a and 30b) being output/being able to be output as a control signal 38 from the actuator 36 to the single normally closed valve/the normally closed valves 30a and 30b. The first average setpoint current strength (for each actuated normally closed valve 30a and 30b) means a current strength not equal to zero. Accordingly, a holding current with at least the first average setpoint current strength (for each actuated normally closed valve 30a and 30b) is sufficient to control and to reliably keep the single normally closed valve/the normally closed valves 30a and 30b in the respective open state thereof. Moreover, a plurality of normally closed valves 30a and 30b can also be actuated/are actuated by the actuator 36 by means of a common (single) control signal 38.

The single normally closed valve/each of the normally closed valves 30a and 30b can be controlled and kept in the closed state thereof by interrupting/inhibiting the output of the control signal 38. A closing time between a first point in time of interrupting/inhibiting a current supply to the single normally closed valve/the normally closed valves 30a and 30b and a second point in time of completed closure of the respective normally closed valve 30a and 30b can also be referred to as a holding time.

Moreover, during the controlling and holding of the single normally closed valve/the normally closed valves 30a and 30b in the respective open state, the actuator is additionally arranged to increase the holding current that is output to the single normally closed valve/the normally closed valves 30a and 30b to at least a second average setpoint current strength (for each actuated normally closed valve 30a and 30b) that is greater than the first average setpoint current strength, while taking into account information provided 40a and 40b. A holding current with the second average setpoint current strength (for each actuated normally closed valve 30a and 30b) is more than is necessary for opening and holding open the single normally closed valve/the normally closed valves 30a and 30b. The second average setpoint current strength preferably means a current strength of such a magnitude that the single normally closed valve/the normally closed valves 30a and 30b is/are operated in an overcurrent state with a holding current with the second average setpoint current strength (for each actuated normally closed valve 30a and 30b).

The information provided 40a and 40b can be at least one actual value from a number of actual values regarding a current revolution rate of the electric motor 24 of the piston-cylinder mechanism 20 of the brake system and/or at least one current hydraulic pressure in at least one sub-volume of the brake system that is/are taken into account. For example, at least one motor sensor 42, at least one input pressure sensor and/or at least one pressure sensor 46a and 46b (connected to a brake circuit 12a or 12b) can be used to provide the information 40a and 40b.

The actuator 36 thus operates the single normally closed valve/the normally closed valves 30a and 30b depending on an operating point (defined by the current revolution rate of the motor and/or the at least one current hydraulic pressure). In doing so, the actuator 36 exploits the fact that the closing time/holding time is extended by increasing the holding current to at least the second average setpoint current strength (for each actuated normally closed valve 30a and 30b), which is greater than the first average setpoint current strength. Whereas a holding current with the first average setpoint current strength (for each actuated normally closed valve 30a and 30b) brings about a first closing time (between the first point in time of interrupting/inhibiting the current supply and the second point in time of a completed valve closure), a second closing time that is longer than the first closing time lies between the first point in time of interrupting/inhibiting the current supply of a holding current with the second average setpoint current strength (for each actuated normally closed valve 30a and 30b) and the second point in time of a completed valve closure. Said extension of the closing time/holding time of the single normally closed valve/the normally closed valves 30a and 30b can be used to decrease (at least for the most part) the kinetic energy of the electric motor 24 in the wheel brake cylinders 14a and 14b.

If the current supply thereof suddenly fails during operation of the electric motor 24, then the (current) kinetic energy of the no longer controllable electric motor 24 continues to drive said motor for a decay time. This process takes place until the kinetic energy of the electric motor 24 is reduced by friction or compression forces. If in the event of failure of the current supply the electric motor 24 displaces the at least one piston 22 lust into the at least one associated intermediate storage volume 26, then the kinetic energy of the no longer controllable electric motor 24 continues to drive the at least one piston 22 during the decay time and the at least one intermediate storage volume 26 is further reduced during the decay time. As long as the single normally closed valve/the normally closed valves 30a and 30b remains/remain open, the volume of brake fluid displaced during the decay time by means of the at least one piston 22 is displaced from the at least one intermediate storage volume 26 into the wheel brake cylinder 14a and 14b, whereas closing of the single normally closed valve/the normally closed valves 30a and 30b by the further displacement of the at least one piston 22 by means of the no longer controllable electric motor 24 results in a build-up of pressure in the at least one intermediate storage volume 26.

The design of the controller 34/actuator 36 for operating the single normally closed valve/the normally closed valves 30a and 30b depending on the operating point (defined by the current revolution rate of the motor and/or the at least one current hydraulic pressure) ensures however that, because of the extension of the closing time/holding time itself that occurs when required in the event of relatively high kinetic energy of the electric motor 24 at the point in time of the failure of the current supply thereof, the volume of brake fluid displaced during the decay time by means of the at least one piston 22 is still (at least for the most part) displaced into the wheel brake cylinder 14a and 14b. The decrease of the kinetic energy of the electric motor 24 thus takes place in the wheel brake cylinder 14a and 14b with soft transmission elasticity, and therefore does not result/hardly results in damage to a component of the brake system. The occurrence of unwanted high pressures (pressure peaks) in the at least one intermediate storage volume 26 is prevented. Likewise, the action of high torques (torque peaks) on the gearbox 28 is prevented. In particular, there is no danger of unwanted compression of the gearbox 28. Because the advantageous operation of the controller 34/actuator 36 amounts to the prevention of pressure and torque peaks in the event of a failure of the current supply of the electric motor 24, a sudden failure of the onboard electrical system (especially during operation of the piston-cylinder mechanism 20 to build up pressure in at least one of the brake circuits 12a and 12b) has no associated risk of damage to or destruction of a component of the brake system, especially a component of the drive train of the brake system. Instead, the advantageous design of the controller 34/actuator 36 reduces the load on the component of the brake system occurring in this situation, in particular the component of the drive train, a sustainable load.

Because overdriving the single normally closed valve/the normally closed valves 30a and 30b with the holding current with at least the second average setpoint current strength takes place depending on the operating point (defined by the current revolution rate of the motor and/or the at least one current hydraulic pressure), it only occurs as a rule if the electric motor 24 is running at a high revolution rate and/or the at least one current hydraulic pressure is relatively high. During controlling and holding of the single normally closed valve/the normally closed valves 30a and 30b in the respective open state, the actuator 36 is preferably designed to (only then) increase the holding current to at least the second average setpoint current strength once the current revolution rate of the motor exceeds a predetermined revolution rate limit of the motor and/or the current hydraulic pressure exceeds a predetermined pressure limit. Thermal disadvantages of overdriving the single normally closed valve/the normally closed valves 30a and 30b thus remain within limits. In particular, there is no risk of overheating of valve coils. For example, the actuator 36 can be designed to keep the holding current at the first average setpoint current strength during the controlling and holding of the single normally closed valve/the normally closed valves 30a and 30b in the respective open state, as long as the current revolution rate of the motor is less than the predetermined revolution rate limit of the motor and/or the current hydraulic pressure is less than the predetermined pressure limit, and to (only then) increase the holding current to the second average setpoint current strength once the current revolution rate of the motor exceeds the predetermined revolution rate limit of the motor and/or the current hydraulic pressure exceeds the predetermined pressure limit. The first average setpoint current strength can lie between 0.3 A (Amperes) and 1 A (Ampere), whereas the second average setpoint current strength lies between 1.5 A (Amperes) and 3 A (Amperes). The numerical values mentioned here are only to be considered as examples, however.

Only as optional components, the brake system of FIG. 1 comprises wheel inlet valves 48, wheel outlet valves 50, brake actuation sensors 52 associated with the brake pedal 22, a brake fluid reservoir 54 and a simulator 56, which is connected to the pressure chamber 16a via an isolating valve 58 and a non-return valve 60 disposed in parallel with the isolating valve 58. The at least one intermediate storage volume 26 can be connected to the brake fluid reservoir 54 via a further non-return valve 62.

FIG. 1b shows a coordinate system, the abscissa of which represents a current average current strength of a holding current (in Amperes) in the event of a failure of the current supply of the electric motor 24, and the ordinate of which represents a maximum pressure $p_{max}$ (in bar) occurring in the at least one intermediate storage volume 26 in this case. One graph g1 shows a relationship between the current average current strength I and the maximum pressure $p_{max}$ occurring for a residual volume of 1 cm$^3$ of the at least one intermediate storage volume 26 at the point in time of the failure of the current supply of the electric motor 24. By means of a graph g2, a relationship is represented between the current average current strength I and the maximum pressure $p_{max}$ occurring for a residual volume of 10 cm$^3$ of the at least one intermediate storage volume 26 at the point in time of the failure of the current supply of the electric motor 24. It can be seen that by means of the increase in the current average setpoint current strength I of the holding current, the maximum pressure $p_{max}$ can be reduced to 190 bar instead of about 250 bar. (The closing time/holding time can be increased to 10-15 ms (milliseconds) by means of the increase in the current average setpoint current strength I of the holding current.)

Figure 2:
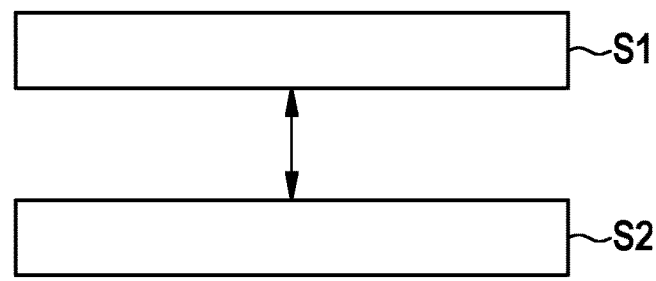
FIG. 2 shows a flow chart for describing an embodiment of the method for actuating at least one normally closed valve of a brake system of a vehicle

FIG. 2 shows a flow chart for describing an embodiment of the method for actuating at least one normally closed valve of a brake system of a vehicle.

When carrying the method out, controlling and holding the at least one normally closed valve in the open state thereof takes place by outputting a holding current to the at least one normally closed valve with at least one first average setpoint current strength for each actuated normally closed valve as step S1 of the method. Before or during step S1 of the method (i.e. during the controlling and holding of the at least one normally closed valve in the open state thereof), at least one actual value relating to a current motor revolution rate of an electric motor of an intermediate storage volume of the brake system and/or at least one current hydraulic pressure in at least one sub-volume of the brake system is/are determined in a step S2 of the method that is carried out at least once. Following step S2 of the method, a current average setpoint current strength of the holding current that is output to the normally closed valve is selected from a range of values containing at least the first average setpoint current strength for each actuated normally closed valve and a second average setpoint current strength for each actuated normally closed valve that is greater than the first average setpoint current strength, while taking into account the at least one determined actual value. The advantages described above can also be realized by implementing steps S1 and S2 of the method.

During step S1 of the method (i.e. while controlling and holding the at least one normally closed valve in the open state thereof), the holding current that is output to the at least one normally closed valve is preferably (only then) increased to at least the second average setpoint current strength for each actuated normally closed valve once the at least one actual value exceeds at least one associated comparison value relating to a predetermined revolution rate limit of the motor and/or at least one predetermined pressure limit. For example, (while controlling and holding the at least one normally closed valve in the open state thereof) the holding current can be held at the first average setpoint current strength between 0.3 A and 1 A, as long as the at least one actual value is less than the at least one associated comparison value, and the holding current is (only then) increased to the second average setpoint current strength between 1.5 A and 3 A, once the at least one actual value exceeds the at least one associated comparison value.

Steps S1 and S2 of the method can also be carried out in a method for operating a brake system of a vehicle with a master brake cylinder, at least one connected brake circuit with at least one wheel brake cylinder and an intermediate storage volume. The implementation of said method is neither limited to a defined type of brake system nor to a specific type of vehicle.

By actuating at least one normally closed valve, via which at least one intermediate storage volume of the piston-cylinder mechanism is hydraulically connected to the at least one associated brake circuit, while carrying out steps S1 and S2 of the method, brake fluid can be displaced from the at least one intermediate storage volume into the at least one associated brake circuit via the at least one normally closed valve controlled and held in the open state thereof. This can be used for brake force boosting and/or for external power braking (without the operation of a brake pedal by a driver). In particular, the brake fluid can be displaced from the at least one intermediate storage volume into a first brake circuit and into a second brake circuit as the at least one brake circuit by controlling and keeping a first normally closed valve and a second normally closed valve as the at least one normally closed valve in the open state thereof. (In this case, the brake fluid is displaced from the at least one intermediate storage volume via the first normally closed valve into the first brake circuit and via the second normally closed valve into the second brake circuit.)

The invention claimed is:

1. A controller for at least one normally closed valve of a brake system of a vehicle, comprising:
    an actuator configured to control and to hold the normally closed valve in an open state by outputting a holding current with at least one first average setpoint current strength from the actuator to the normally closed valve as a control signal, wherein the normally closed valve hydraulically connects an intermediate storage volume to at least one brake circuit of the brake system such that, in the open state, brake fluid is displaceable from the intermediate storage volume into the at least one brake circuit, wherein during the controlling and holding of the normally closed valve in the open state, the actuator is further configured to increase the holding current that is output to the normally closed valve to at least one second average setpoint current strength that is greater than the first average setpoint current strength and greater than a current strength that fully opens the normally closed valve, based on information provided about a current motor revolution rate of an electric motor of a piston-cylinder mechanism of the brake system and/or at least one current hydraulic pressure in at least one sub-volume of the brake system.

2. The controller as claimed in claim 1, wherein, during the controlling and holding of the normally closed valve in the open state, the actuator is configured to increase the holding current to at least the second average setpoint current strength once the current motor revolution rate of the electric motor exceeds a predetermined revolution rate limit of the electric motor and/or the at least one current hydraulic pressure exceeds at least one predetermined pressure limit.

3. The controller as claimed in claim 2, wherein, during the controlling and holding of the normally closed valve in the open state, the actuator is configured to:
 keep the holding current at the first average setpoint current strength, which is between 0.3 A and 1 A, as long as the current motor revolution rate of the electric motor is less than the predetermined revolution rate limit of the electric motor and/or the at least one current hydraulic pressure is less than the at least one predetermined pressure limit, and
 increase the holding current to the second average setpoint current strength, which is between 1.5 A and 3 A, once the current motor revolution rate of the electric motor exceeds the predetermined revolution rate limit of the electric motor and/or the at least one current hydraulic pressure exceeds the at least one predetermined pressure limit.

4. The controller as claimed in claim 1, wherein the at least one first average setpoint current strength is equal to or greater than the current strength that fully opens the normally closed valve.

5. A brake system for a vehicle comprising:
 a controller;
 a normally closed valve configured to be controlled and held in an open state by the controller;
 a master brake cylinder;
 at least one brake circuit connected to the master brake cylinder and including at least one wheel brake cylinder; and
 a piston-cylinder mechanism having an electric motor and at least one intermediate storage volume hydraulically connected to the at least one brake circuit via the normally closed valve such that brake fluid is displaced from the at least one intermediate storage volume into the at least one brake circuit via the normally closed valve in the open state, and
 wherein the controller includes an actuator configured to:
  control and to hold the normally closed valve in the open state by outputting a holding current with at least one first average setpoint current strength from the actuator to the normally closed valve as a control signal, and
  increase the holding current that is output to the normally closed valve to at least a second average setpoint current strength that is greater than the at least one first average setpoint current strength and greater than a current strength that fully opens the normally closed valve based on information provided about a current motor revolution rate of the electric motor and/or at least one current hydraulic pressure in at least one sub-volume of the brake system.

6. The brake system as claimed in claim 5, further comprising:
 a further normally closed valve configured to be controlled and held in an open state by the controller,
 wherein the at least one brake circuit includes a first brake circuit and a second brake circuit connected to the master brake cylinder,
 wherein the at least one intermediate storage volume is hydraulically connected to the first brake circuit via the normally closed valve and is hydraulically connected to the second brake circuit via the further normally closed valve, and
 wherein during controlling and holding of the normally closed valves in the open state thereof, the actuator of the controller is configured to increase the holding current that is output to the normally closed valve and the further normally closed valve to at least the second average setpoint current strength based on the information provided.

7. The brake system as claimed in claim 5, wherein the at least one first average setpoint current strength is equal to or greater than the current strength that fully opens the normally closed valve.

8. A method for actuating at least one normally closed valve of a brake system of a vehicle, the method comprising:
 controlling and holding the at least one normally closed valve in an open state by outputting a holding current with at least one first average setpoint current strength for each actuated normally closed valve to the at least one normally closed valve;
 determining, during the controlling and holding of the at least one normally closed valve in the open state, at least one actual value relating to a current motor revolution rate of an electric motor of a piston-cylinder mechanism of the brake system and/or at least one current hydraulic pressure in at least one sub-volume of the brake system; and
 selecting a current average setpoint current strength of the holding current that is output to the at least one normally closed valve from a range of values containing at least the first average setpoint current strength for each actuated normally closed valve and a second average setpoint current strength for each actuated normally closed valve that is greater than the first average setpoint current strength and greater than a current strength that fully opens the valve, based on the determined at least one actual value.

9. The method as claimed in claim 8, wherein during the controlling and holding of the at least one normally closed valve in the open state, the method further includes:
 increasing the holding current that is output to the at least one normally closed valve to at least the second average setpoint current strength for each actuated normally closed valve once the at least one actual value exceeds at least one associated comparison value related to a predetermined revolution rate limit of the electric motor and/or at least one predetermined pressure limit.

10. The method as claimed in claim 9, wherein during the controlling and holding of the at least one normally closed valve in the open state, the method further includes:
keeping the holding current at the first average setpoint current strength, which is between 0.3 A and 1 A, as long as the determined at least one actual value is less than the at least one associated comparison value, and
increasing the holding current to the second average setpoint current strength, which is between 1.5 A and 3 A, once the determined at least one actual value exceeds the at least one associated comparison value.

11. The method as claimed in claim 9, wherein:
a brake system of a vehicle includes a master brake cylinder, at least one connected brake circuit including at least one wheel brake cylinder and a piston-cylinder mechanism, and
wherein the method further includes actuating the at least one normally closed valve, via which at least one intermediate storage volume of the piston-cylinder mechanism is hydraulically connected to the at least one connected brake circuit to displace brake fluid from the at least one intermediate storage volume into the at least one connected brake circuit via the at least one normally closed valve.

12. The method as claimed in claim 11, further comprising:
displacing the brake fluid from the at least one intermediate storage volume into a first brake circuit and into a second brake circuit as the at least one connected brake circuit by controlling and keeping a first normally closed valve and a second normally closed valve as the at least one normally closed valve in the open state.

13. The method as claimed in claim 8, wherein the first average setpoint current strength is equal to or greater than the current strength that fully opens the normally closed valve.

* * * * *